Feb. 16, 1960     H. C. FLINT     2,925,120
UNISON ACTION SEAT

Filed March 18, 1957     7 Sheets-Sheet 1

INVENTOR.
Hyland C. Flint
BY
Harness, Dickey & Pierce
ATTORNEYS

Fig. 7.

Feb. 16, 1960  H. C. FLINT  2,925,120
UNISON ACTION SEAT
Filed March 18, 1957  7 Sheets-Sheet 5

INVENTOR.
Hyland C. Flint.
BY
Harness, Dickey & Pierce
ATTORNEYS.

United States Patent Office 2,925,120
Patented Feb. 16, 1960

2,925,120

UNISON ACTION SEAT

Hyland C. Flint, Novi, Mich.

Application March 18, 1957, Serial No. 646,799

12 Claims. (Cl. 155—53)

This invention relates to seat constructions, and particularly to a seat construction of the controlled unison type.

Considerable work was done over quite a number of years in an attempt to produce a satisfactory unison type of seat structure. Such a structure embodied a seat cushion and a back cushion, both of which move in synchronized relation to each other after the seat cushion is occupied. Not only is it difficult to produce the unison movement between the back and seat cushions, but the control of the rate of operation also was never satisfactory.

In practicing the present invention, a seat cushion is constructed on a platform to which the trim material is secured in sealed relation. An adjustable aperture in the platform controls the rebound of the seating surface as the air moves in and out through the aperture. When too much rebound occurs, the aperture is adjusted to a smaller area to restrict the outward flow of air and increase the snubbing action by the air trapped by the upholstery material. To produce this bellowslike effect, the trim material must be substantially impervious to the flow of air. Thus, leather, plastic, treated woven fabric materials and the like may be employed for this purpose. Spring strips extend across the seating area and have resilient supporting portions projecting downwardly at each end which are secured to the edge of the platform which forms the base of the cushion. Such spring strips may extend from the front to the rear or from side to side of the cushion. Laterally of such spring strips, additional spring strips are employed having a load bearing section from which resilient supporting portions extend downwardly and are attached to the base with the load supporting section thereof disposed beneath the load supporting section of the main spring strips.

A strip of fabric in the nature of a saddle is placed upon the top of the lower laterally extending spring strips, secured at the ends to the arms of a spreader frame to which the arms of the back cushion supporting frame are pivoted. The back cushion supporting frame is pivoted to a pair of arms on a yoke which is pivoted to a back supporting frame extending upwardly from the seat frame. The saddle is disposed below and is spaced from the load supporting portion of the main spring strip and during initial deflection under load will not materially move the back cushion supporting frame. When completely loaded, the back frame and cushion frame move thereafter in unison. This movement, as far as the spring rate is concerned, is controlled by the bellowslike action of the upholstery material which restricts the reactive force of the spring strips.

The spring strips can be employed for producing the unison seat structure either as a single seat unit for the driver alone or as a multiple seat construction for the driver and the occupant, extending across the entire width of the vehicle body.

Accordingly, the main objects of the invention are: to provide a unison seat in which a seat and a back cushion move together at a rate controlled by the regulated flow of air to and from the area enclosed by the seat cushion trim material; to provide a unison seat construction wherein independent trim cushions for the seat and back are interconnected to move in unison with a layer of material on the seat cushion constructed to function as a bellows for moving air therefrom through an adjustable aperture; to form a multiple unison seat structure from two separate seat cushions spaced by a central spring unit trimmed in a manner to permit each cushion with its associated back cushion to operate independently of the other, and, in general, to provide a unison seat which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

Fig. 8 is a view in front elevation of a seat construction of the present invention which extends entirely across the vehicle body, with parts in section and parts broken away;

Fig. 9 is a reduced end view of the structure illustrated in Fig. 8, with parts broken away;

Referring to Figs. 1 to 7, a unison seat construction is illustrated embodying a seat cushion 15 and a back cushion 16 which has a pair of downwardly and forwardly extending arms 17, the back cushion being supported on fixed back frame members 18 by a pivoted yoke member 19. The seat cushion is welded to the horizontal U-shaped portion 21 of the back frame members 18. This U-shaped portion may be provided with a strip 22 at each side by which it is secured to the inverted channel-shaped elements 23 by studs 24. Rollers 25 are pivoted within the channel-shaped elements 23 to ride upon the top flange 27 of the base element 28.

The platform 29 of the seat cushion 15 comprises a stamping 31 in the nature of a pan having a downwardly extending flange 32 about its peripheral edge which is inwardly and upwardly flanged at 33 to form an upwardly presenting channel 34 inwardly of the edge of the flange 32. Spring supporting rails 35 and 36 are welded or otherwise secured along the front and rear edge of the pan 31, while spring supporting elements 37 are welded or otherwise secured at the side edges of the pan. Formed wire spring strips 38 constitute the main load bearing spring elements of the cushion, a plurality thereof having their ends attached to the front and rear rails 35 and 36. Each of the springs has a load bearing portion 39 which contours in a predetermined manner under load due to the shape and spacing of the various loops 41 provided therein. V-shaped end portions 42 and 43 extend downwardly from the front and rear ends of the load bearing portion 39, providing a resilient support for the load bearing sections. The ends of the V-shaped portion are inserted in tunnels 44 formed in the rail elements 35 and 36 in the conventional manner.

Figures 1, 2, 3:
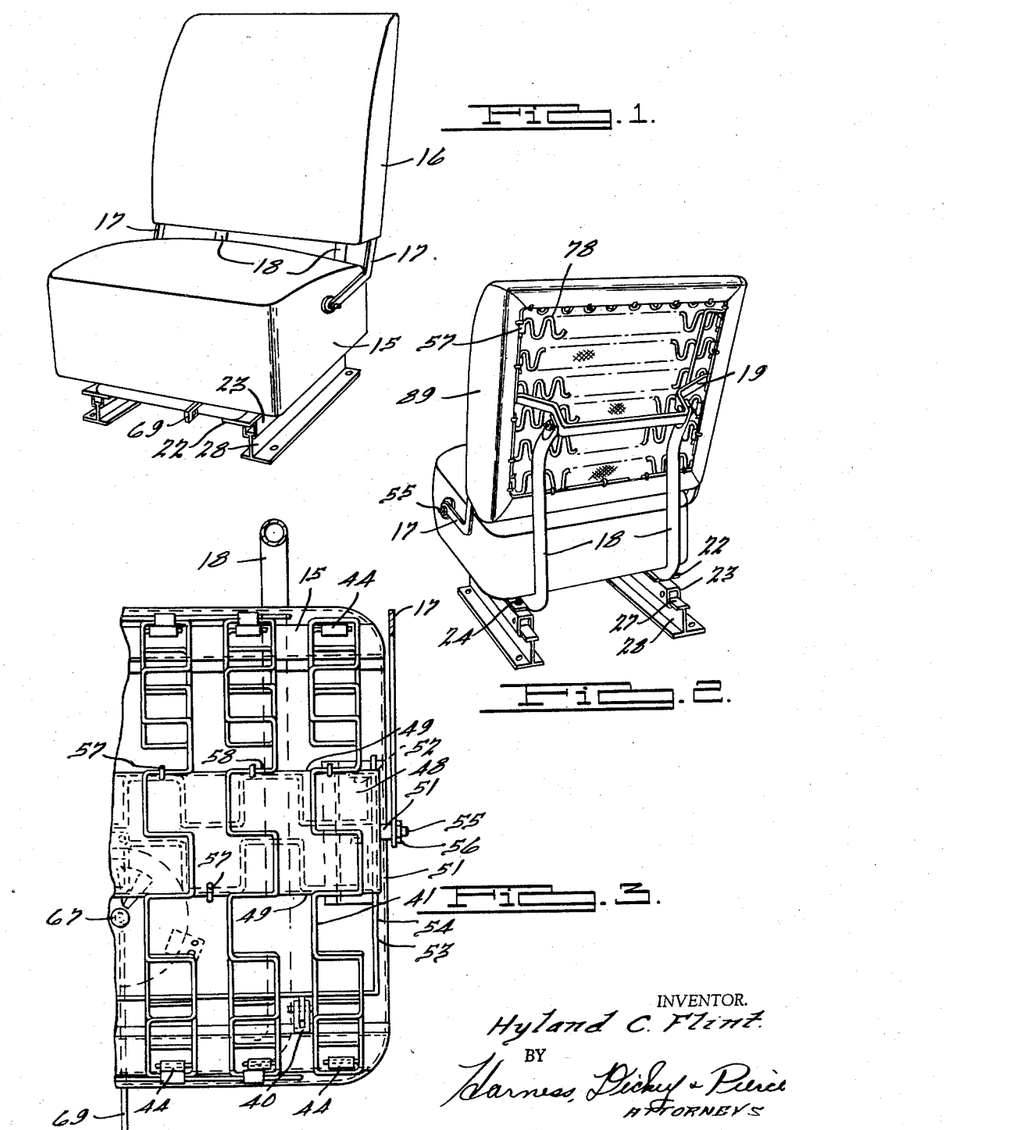
Figure 1 is a perspective view of a unison seat made in accordance with the present invention, as viewed from the front thereof.
Fig. 2 is a rear view of the structure illustrated in Fig. 1.
Fig. 3 is an enlarged, broken plan view of the spring arrangement of the seat cushion of the seat illustrated in Fig. 1.
Figures 4, 5:
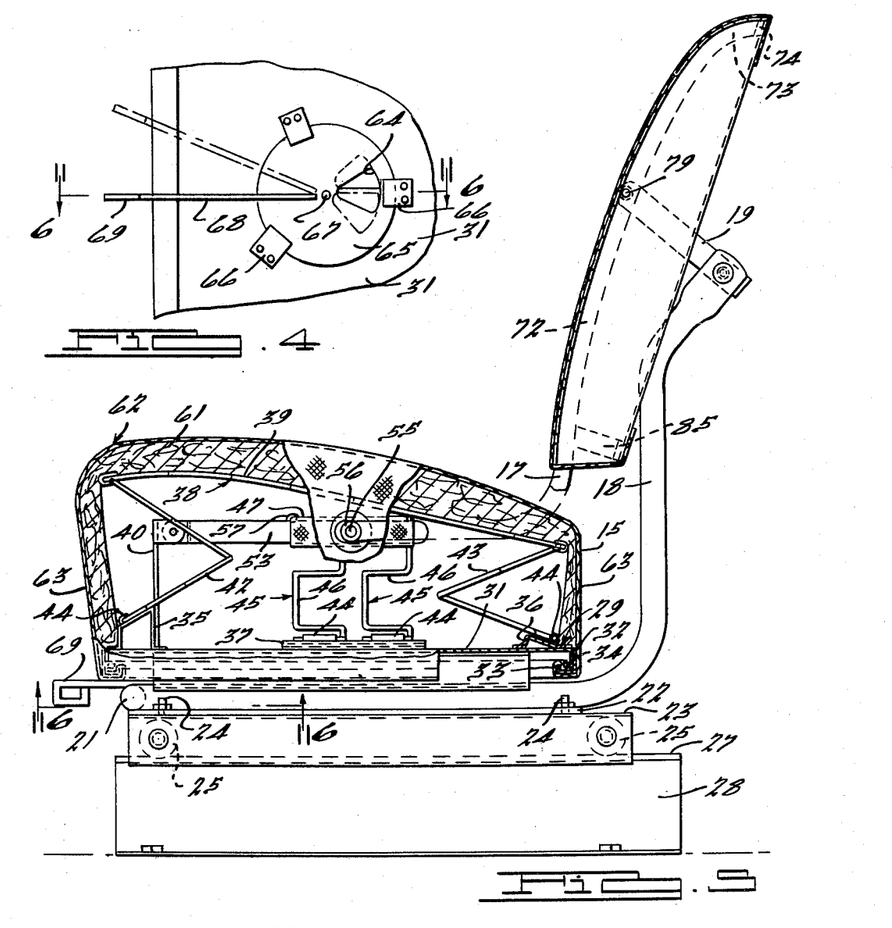
Fig. 4 is a broken bottom view of the structure illustrated in Fig. 3.
Fig. 5 is an enlarged, broken view in side elevation, with parts in section, of the seat structure as illustrated in Fig. 1.

Similar spring strips 45, which are herein illustrated as two in number, have V-shaped supporting ends 46 and a load bearing section 47. The ends of the V-shaped portions 46 are secured in tunnels 44 of the spring supporting elements 37. A strip of fabric material 48 has a narrow hem 49 at the forward and rear edges and wide hems 51 at the side edges. A plurality of wire spacer elements 52 are provided from front to the rear edge 49 at several spaced points across the seat construction. A U-shaped stretcher frame 53 extends across the seat from side to side and is pivotally secured to uprights 40 attached to the rail element 35. The arm portions 54 at each side are disposed in the wide hems 51 of the fabric material 48. The hems 51 are made large enough to permit a shouldered stud 55 on the arm portions to pass therewithin and out through an aperture in the central outer side of the hem. The ends of the arms 17 have apertures which receive the studs 55 and secured thereon in a suitable manner, herein illustrated as by nuts 56. Preferably, hog rings 57 connect the narrow hem 49 at the rear edge of the fabric material 48 to laterally extending portions 58 of the spring strips 38, although these may be omitted. The front hem 49 is secured by hog rings 57 to the cross members of the frontmost lateral spring strip 45. The front hem 49 of the material 48 and the stretcher element 53 are spaced from the main load bearing spring strips 38 to move downwardly about the pivots of the uprights 40.

Figure 6:
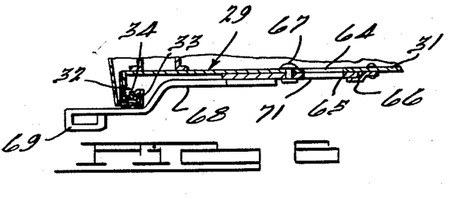
Fig. 6 is a sectional view of the structure illustrated in Fig. 4, taken on the line 6—6 thereof.

Conventional padding material 61 is placed over the spring strips 38 and covered by a trim material 62. The material is stitched together and has the shape of an inverted bag, the sides 63 of which are stretched downwardly and the ends drawn around the flange 32 and the reverse flange portion 33. The end edges are placed across the channel portion 34 and engaged by suitable clips or other means well known in the art to lock the material to the platform. The trim material 62 is preferably impervious to the passage of air or any substantial amount of air so that it will act as a bellows for controlling the flow of air inwardly and outwardly of an aperture 64 in the pan 31. A circular plate 65 is retained against the bottom face of the pan 31 by a plurality of offset fingers 66 and a central rivet 67. The plate has an aperture 71 which may be aligned with the aperture 64 and is positioned by an adjusting arm 68 welded or otherwise secured thereto. The unsecured end of the arm 68 extends forwardly of the front portion of the seat and is bent to form a handle 69. By shifting the handle 69 laterally about the pivot 67, the plate 65 is rotated to have the aperture 71 coincide or partially coincide with the aperture 64 to control the size of the passageway through the pan 31. The plate 65 is adjusted to control the flow of air through the aperture 64 in an amount which conforms to the resiliency of the spring strips and the weight of the load so as to produce a proper snubbing action which prevents the throwing of the occupant upwardly on the seat cushion.

Figure 7:
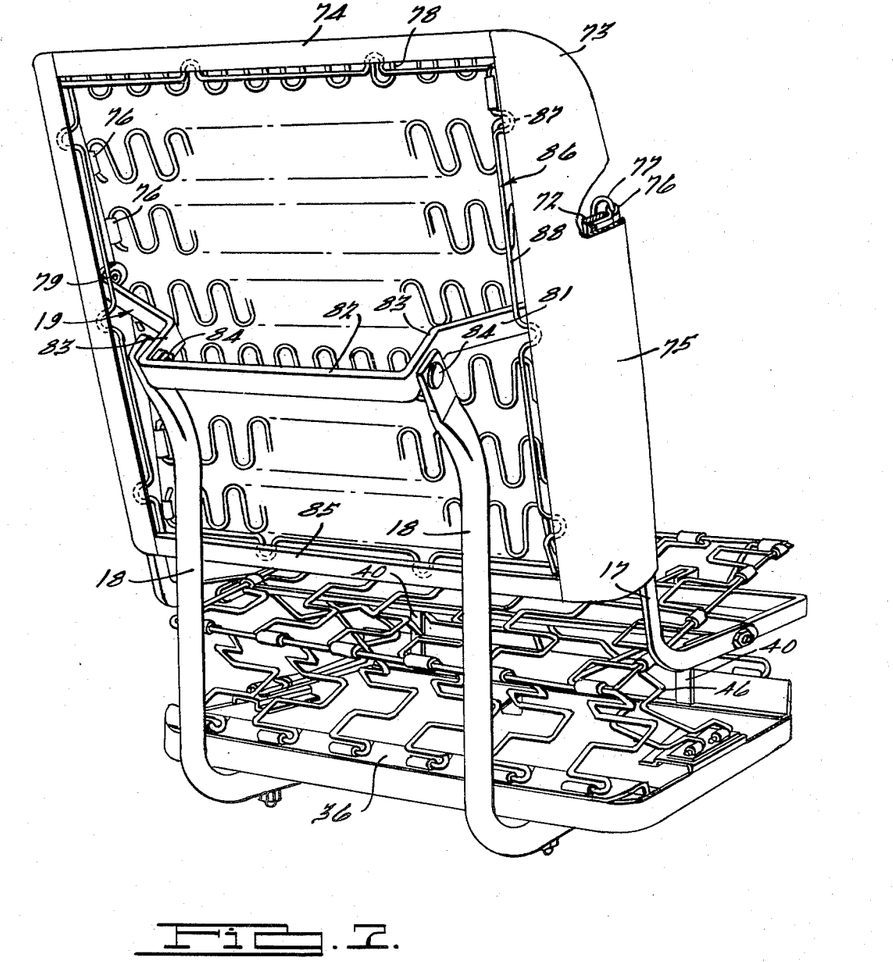
Fig. 7 is an enlarged rear plan view of the seat structure illustrated in Fig. 2, with the upholstery material removed therefrom.
Figures 10, 11:
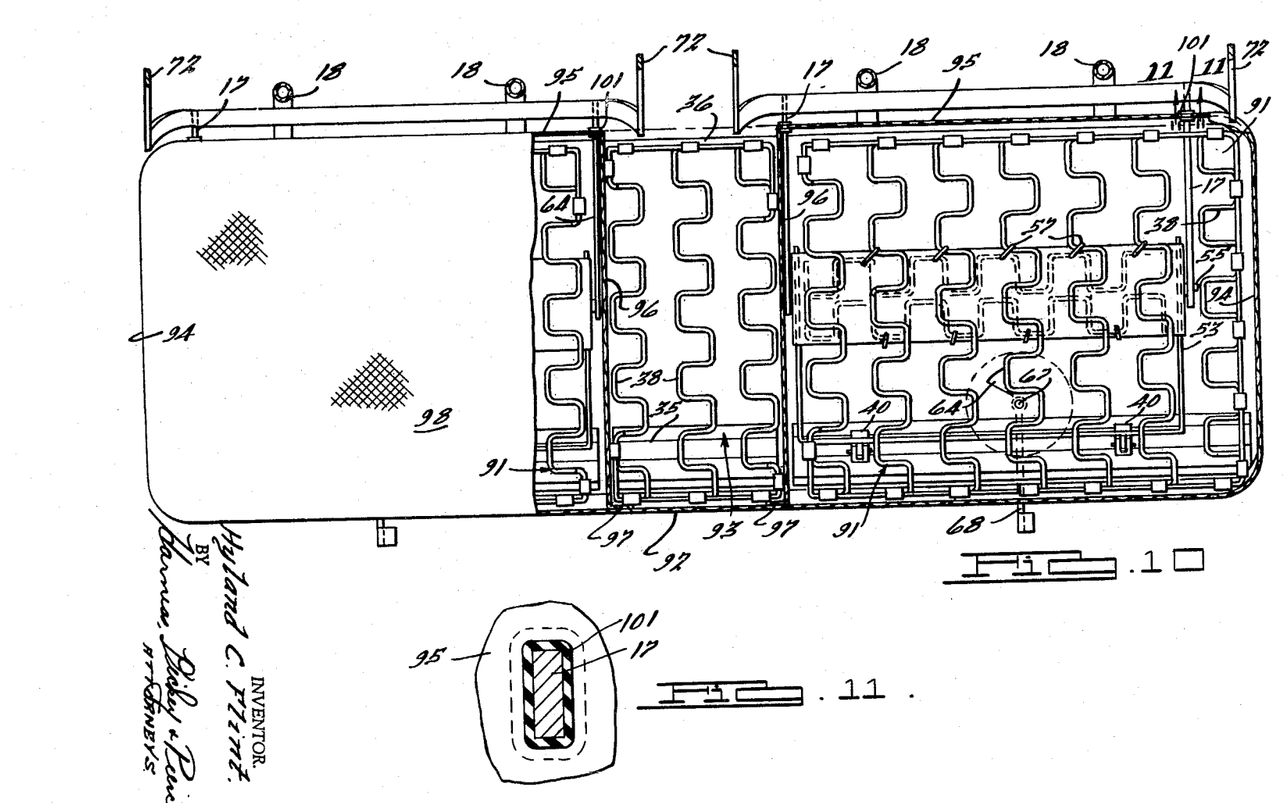
Fig. 10 is a sectional view of the structure illustrated in Fig. 8, taken on the line 10—10 thereof.
Fig. 11 is an enlarged, broken sectional view of the structure illustrated in Fig. 10, taken on the line 11—11 thereof.

The arms 17 of the back cushion are extended upwardly at 72 and curved rearwardly at 73 and extended laterally at 74 across the top of the back cushion. Arcuate-shaped side panels 75 are secured at the sides of the arms 17 at the upwardly and rearwardly curved portions thereof. Tabs 76 are provided on the forward edge of the stampings, being reversely bent to form outwardly directed channel elements 77 for receiving the ends of the spring strips 78 which extend across the front face of the frame between the upwardly extending portions 72 thereof. The upwardly extending portions 76 of the arms 17 have inwardly extending studs 79 thereon to which ends of the U-shaped yoke member 19 are secured for pivotal movement thereon. The yoke member has angularly disposed portions 81 which extend from the central U-shaped portion 82, the forwardly extending sections 83 thereof being pivotally secured by studs 84 to the upper ends of the back frame elements 18. A bar 85 is connected to the lower rear ends of the arcuate side panels 75, and to this bar, the back frame portion 74 and the rear edges of the panel 75, wire elements 86 are secured by welding the spaced loop portions 87 thereto. The straight portions 88 between the loop 87 are spaced from the bar portions 74 and 85 and the edge of the side panel 75 a sufficient distance to receive the hog rings 57 for securing the padding and trim material 89 over the spring strips 78 in a conventional manner.

When an occupant sits upon the seat 15, it will deflect until the load supporting portions 39 of the spring strips 38 will bear against the load supporting portion 47 of the spring strip 45 and thereafter the stretcher frame 53 and the spring strips will deflect as a unit. When further loaded, the studs 55 move the arms 17 and the back cushion the same amount as the load bearing portions 39 of the seat cushion to produce a true unison action. The pivoted yoke member 19 permits the back cushion to move upwardly and downwardly with the load bearing portion 39 of the spring strips 38 of the seat cushion. Both of these movements are controlled by the amount of air which may be expelled and breathed in through the trim material 62 and the aperture 64 in the pan 31 forming the base or platform of the cushion. The occupant will immediately sense whether the aperture 64 is closed off too much, hindering the movement of the springs, or whether it is open too wide to cause the occupant to be thrown by the seat cushion. By adjusting the handle portion 69 of the operating arm 68, the plate 65 is rotated to change the size of the opening 64 to further restrict the air flow and further snub the rebound of the spring strips. Not only is a seating construction provided in which seat and back cushions operate exactly in unison, but the operation is regulated to control the action of the spring strips and provide ultimate comfort to the occupant.

Referring to Figs. 8, 9, 10 and 11, a seat construction is illustrated made substantially from two seat units above described which extend entirely across the width of the vehicle body. The spring arrangement of the two units 91 is substantially the same as that of the seat cushion 15 of the structure illustrated in Figs. 1 to 7, with the exception that an additional spring 38 is provided outwardly of the stretcher frame 53. The arms 17 of the back frame are secured to the studs 55 in the same manner as that of the structure of Figs. 1 to 7. A portion 92 of the upholstery material extends across the front of both units and a central unit 93, along the side edges at 94, along the rear edge at 95, and inwardly at 96 where it is joined to the front portion 92 by the overlapping flanges 97 which are stitched, adhered or otherwise secured thereto. The bottom of the fabric material is secured to the base pan 31 in the manner as pointed out hereinabove with regard to the structure of Figs. 1 to 7 and the top trim material 98 covers the padding material which extends entirely across the tops of the three spring units 91, 93 and 91. Each of the seat structures on each side of the central spring unit 93 functions independently, the same as the seat structure of Figs. 1 to 7, since the bottom pan has the aperture 64 therein and the control plate 61 with its operating handle 69. In the structure of Figs. 1 to 7 it will be noted that the side portions 63 of the trim material 62 for the seat cushion was disposed between the arms 17, while in the present arrangement the arms extend through the trim material 95 at the back edge of the seat. Grommets 101 are placed about the arms and sealed to the seat to permit the arms to extend therethrough without leaking any substantial amount of air, and fullness is provided by a lapped portion 102 of the material 95 which permits the independent deflection of the grommets and arms relative to the fabric material 98 covering the top of the seating area. Otherwise, the seat structure is the same as that of Figs. 1 to 7, the two seat cushion frame members 91 being spaced by the central spring unit 93 composed of three spring strips 38 mounted on independent rail elements 35 and 36 which permit the fabric portions 96 to extend between the central spring assembly 93 and the two side spring assemblies 92 and to be secured to an inverted channel attached to the edge of the platform.

Figures 12, 14:
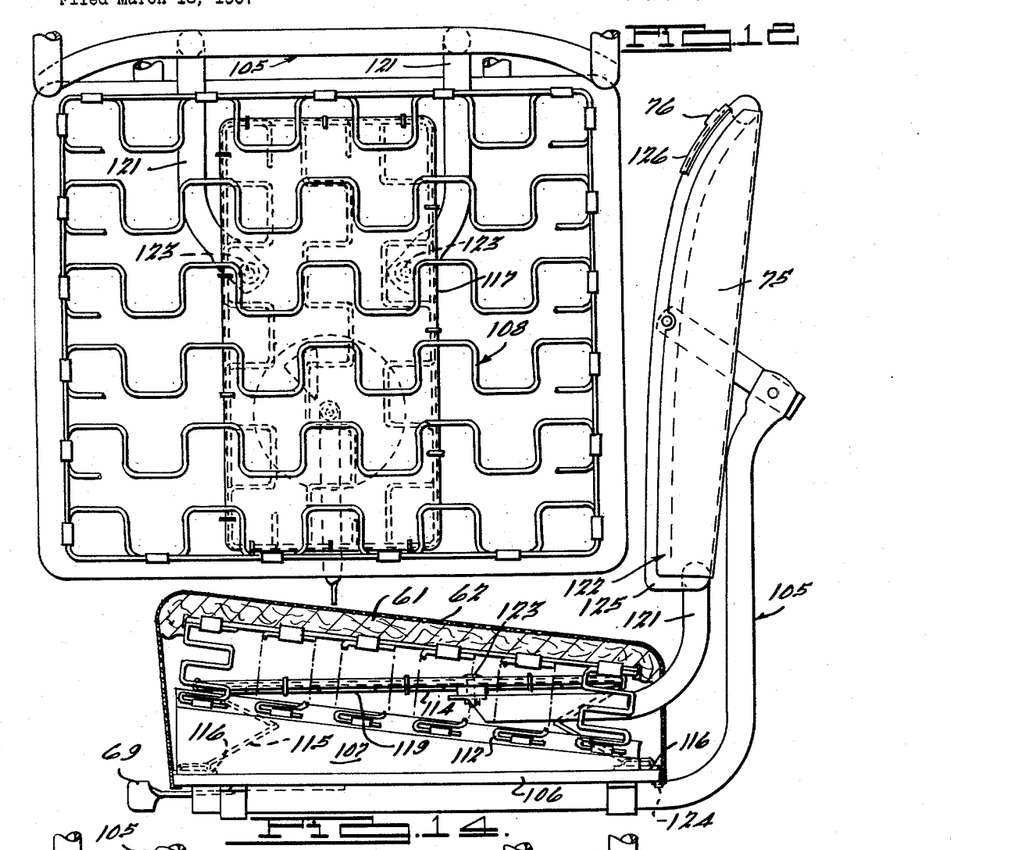
Fig. 12 is a plan view of a single seat unit structure, similar to that illustrated in Fig. 10, with a different arrangement of the spring strips thereon.
Fig. 14 is a view in side elevation of the structure illustrated in Fig. 12.
Figure 13:
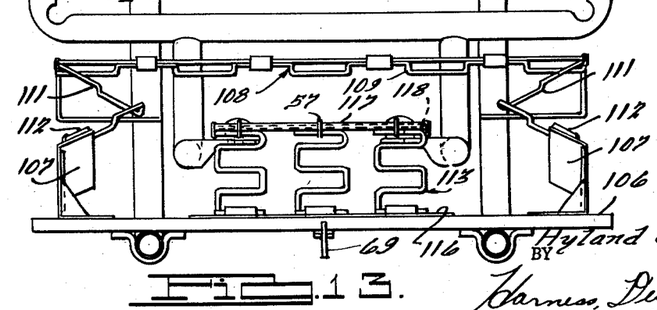
Fig. 13 is a front elevational view of the structure illustrated in Fig. 12.
Figures 15, 16:
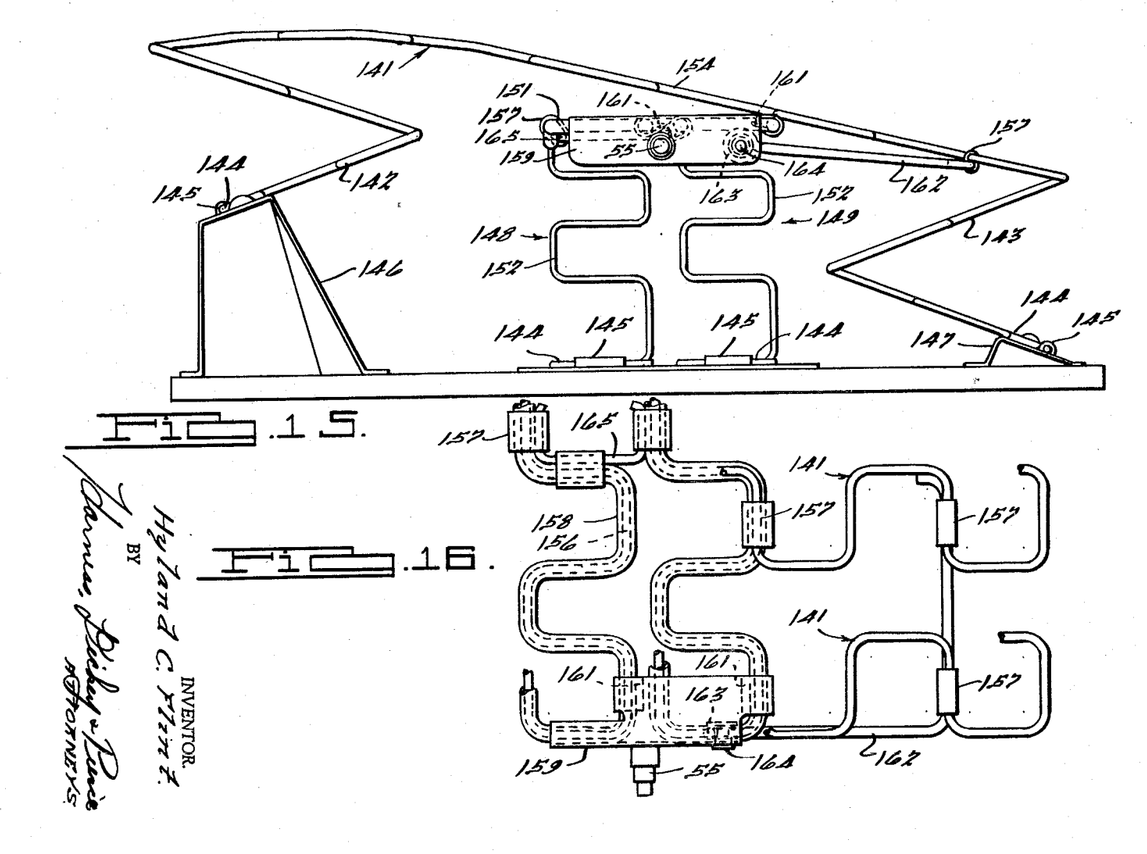
Fig. 15 is a view of the structure, similar to that illustrated in Fig. 9, showing a further form of the invention.
Fig. 16 is a broken plan view of the structure illustrated in Fig. 15.

Referring to Figs. 12, 13 and 14, a union seat structure 105 is illustrated which is similar to that above described with regard to Figs. 1 to 7 and which differs therefrom in that the base panel 106 is made from a sheet of wood or plywood material. Rails 107 are secured at the side edges of the panel 106 for supporting springs 108 having a straight load bearing section 109 terminating at each end in V-shaped supporting sections 111, the end loops 112 of which are secured to the top portion of the rails 107 in the conventional manner.

As illustrated in Fig. 14, the rail elements 107 are higher at the front end, producing a rearward slope to the top seating area of the spring assembly. Beneath the load bearing portions 109 of the spring elements 108, a plurality of spring elements 113 are employed, having a flat load bearing section 114 terminating in V-shaped end sections 115 which are secured by clips 116 to the panel 106. A fabric strip 117 has a border wire 118 in a border hem thereof which is the size of the area formed by the load bearing sections 114 of the three springs 113 herein employed. A plurality of hog rings 57 secure the peripheral edge and border wire 118 to the load bearing sections 114 at the ends thereof, as well as the side edge portions 119 of the springs. Arms 121 extending downwardly and forwardly from the back seat cushion 122 are secured to the fabric material by the vertical clamping bolts or rivets 123. While there is no direct connection herein illustrated between the load supporting sections 109 and 114 of the two different spring assemblies which are disposed laterally of each other, the lower load bearing sections 114 will be contacted by the upper load bearing sections 109 when the seat is occupied, after which both sections will move in unison causing the arm portions 121 of the back seat cushion 122 to move in unison therewith. The padding 61 is covered by the trim material 62, with the ends of the trim material extending downwardly and under the panel 106 to which it is secured in a suitable manner, herein illustrated as by tacks 124. The air control plate 65 operated by the handle portion 69 of the actuating element 68 controls the passage of air from the panel 106 in the manner and for the reason hereinabove described. The arms 121 are welded or otherwise secured to the frame element 125 of the seat back cushion to which the arcuate panels 75 are secured. A strip 126 is welded to the forward portion of the frame element 125 at the sides thereof, having clips 76 of channel section thereon to which the sinuous spring strips 78 are secured laterally across the front face of the rear seat cushion 122.

In Figs. 18 and 19 a still further form of the invention is illustrated, that wherein main load bearing spring strips 141 have V end portions 142 and 143, the ends of which are provided with a loop 144 having an endmost bar which extends within a tunnel 145 on front and rear supporting elements 146 and 147. A pair of similar springs 148 and 149 have straight load bearing sections 151 and V-shaped end portions 152 having loops 144, the endmost bars of which are secured in tunnels 145 at the sides of the frame member 153. The load bearing portions 154 of the spring strips 141 have a transverse bar 155 which mates with a side bar 156 of the spring 149. These two bars of each spring are joined together by a clamping band 157.

Preferably the load bearing portions 151 of the strips 148 and 149 are coated with a soundproof material 158 by dipping, spraying or other process, the material being rubber, plastic or similar adhering material having some degree of resiliency. The two spring strips 148 and 149 are secured together at their ends at the side of the frame by angle-shaped plates 159 which have tabs 161 bent around the endmost side bars 156. Rods 162 are secured to the springs 151 by bands 157 to permit a pivoted movement of the rods, while the opposite end is provided with an eye 163 which engages a pivot 164 on the plates 159. The pivot pin 55 on the side portion of the plates 159 supports the arms 17 of the back cushion element, as pointed out hereinabove. A U-shaped loop of wire 165 is employed to interconnect the load supporting portion 151 of the two springs 148 and 149 to retain them against spreading relative to each other. The resulting spring construction for the seat eliminates the spreader frame illustrated in the foregoing figures and interconnects the helper springs 148 and 149 by the plates 159 to which the arms 17 of the back rest are pivoted. The stabilizing rods 162 permit the upward and downward movement of the seat back with the plates 159 while being stabilized against a forward and rearward movement. The coating 158 of the resilient material on the load bearing section 151 of the springs 148 and 149 prevents the occurrence of squeaks and noises due to the engagement of the load bearing portion 154 of the springs 141 with the load bearing section 151 of the helper springs.

What is claimed is:

1. In a seat construction, a base, spring strips spanning said base from the front to the rear thereof, at least one spring strip spanning said base from side to side thereof, means interconnecting said spring strips, pivoted means supported by said at least one spring strip above each side of the base, a back element having forwardly projecting arms mounted on said pivoted means, and means for supporting said back element from said base in a manner to permit the upward and downward movement thereof.

2. In a seat construction, a base, spring strips spanning said base from the front to the rear thereof, at least one spring strip spanning said base from side to side thereof, means interconnecting said spring strips, pivoted means supported by said at least one spring strip above the sides of the base, a back element having forwardly projecting arms mounted on said pivoted means, rigid upwardly extending supporting means secured to said base, and a yoke pivoted to said supporting means and to said back element.

3. In a seat construction, a base, spring strips spanning said base from the front to the rear thereof, at least one spring strip spanning said base from side to side thereof and disposed beneath said first spring strips, means pivotally interconnecting said spring strips, pivoted means supported by said at least one spring strip above the sides of the base, a back element having forwardly projecting arms mounted on said pivoted means, means for supporting said back element from said base in a manner to permit the upward and downward movement thereof, and upholstery material secured over said springs and to said base in substantially sealed relation thereto, said material being substantially impervious to the passage of air therethrough for controlling the action of said springs under load.

4. In a seat construction, a base, spring strips spanning said base from the front to the rear thereof, at least one spring strip spanning said base from side to side thereof and disposed beneath said first spring strips, means pivotally interconnecting said spring strips, pivoted means supported by said at least one spring strip above the sides of the base, a back element having forwardly projecting arms mounted on said pivoted means, means for supporting said back element from said base in a manner to permit the upward and downward movement thereof, upholstery material secured over said springs and to said base in substantially sealed relation thereto, said material being substantially impervious to the passage of air therethrough for controlling the action of said springs under load, said base having an aperture, and means for adjusting the size of the aperture to control the flow of air therethrough.

5. In a unison seat construction, a base having an area substantially the size of the seat made of a material impervious to the passage of air, a plurality of spring strips supported by said base across one dimension thereof, a plurality of spring strips spanning said base transverse of said first springs and disposed therebelow, means pivotally interconnecting said first spring strips to one edge of one of said second spring strips, means carried by said second spring strips having a pivot thereon at each side of the base for unison deflection with both groups of said spring strips, an upholstery material substantially impervious to the passage of air enclosing said spring strips and secured to the base, a back element having forwardly extending arms the ends of which are secured to said pivots, upwardly extending supporting means from said base for the back element, and pivot means interconnecting the supporting means and said back element.

6. In a unison seat construction, a seating spring assembly embodying a base impervious to the passage of air a plurality of springs secured to said base and extending from side to side thereof, a plurality of springs mounted on said base and extending forwardly and rearwardly thereof beneath said first springs, supporting means extending upwardly from the base, a back unit having forwardly extending arms secured to the springs extending forwardly and rearwardly of the base, pivot means securing the back unit to the upwardly extending supporting means, and upholstery material substantially impervious to the passage of air extending over said spring assembly and secured to said base.

7. In a unison seat construction, a base made of a material impervious to the passage of air, a plurality of spring units secured to said base and extending forwardly and rearwardly thereacross, a plurality of spring strips secured to said base extending laterally of and disposed beneath said first spring strips, means interconnecting said spring strips, a U-shaped spreader extending across said transverse spring strips and along the sides thereof, pivots on the side portion of said spreader, pivot means securing one end of said spreader to said base to prevent the forward and rearward movement thereof, supporting means extending upwardly from the base, a back rest unit, pivot means interconnecting the upwardly extending supporting means to said back rest unit, forwardly extending arms on said back rest unit secured on said pivots, and upholstery material impervious to the passage of air extending over said spring assembly and secured in substantially sealed relation to said base.

8. In a unison seat construction, a base made of a material impervious to the passage of air, a plurality of spring units secured to said base and extending forwardly and rearwardly thereacross, a plurality of spring strips secured to said base extending laterally of and disposed beneath said first spring strips, means interconnecting said spring strips, a U-shaped spreader extending across said transverse spring strips and along the sides thereof, pivots on the side portion of said spreader, pivot means securing one end of said spreader to said base to prevent the forward and rearward movement thereof, supporting means extending upwardly from the base, a back rest unit, pivot means interconnecting the upwardly extending supporting means to said back rest unit, forwardly extending arms on said back rest unit secured on said pivots, upholstery material impervious to the passage of air extending over said spring assembly and secured in substantially sealed relation to said base, an aperture in said base, adjustable means for regulating the size of said aperture, said upholstery material extending over said arms, and grommets on said arms connected to said upholstery material to substantially seal the material to the arms.

9. In a unison seat construction, a base made of a material impervious to the passage of air, a plurality of spring units secured to said base and extending forwardly and rearwardly thereacross, a plurality of spring strips secured to said base extending laterally of and disposed beneath said first spring strips, means interconnecting said spring strips, a U-shaped spreader extending across said transverse spring strips and along the sides thereof, pivots on the side portion of said spreader, pivot means securing one end of said spreader to said base to prevent the forward and rearward movement thereof, supporting means extending upwardly from the base, a back rest unit, pivot means interconnecting the upwardly extending supporting means to said back rest unit, forwardly extending arms on said back rest unit secured on said pivots, upholstery material impervious to the passage of air extending over said spring assembly and secured in substantially sealed relation to said base, an aperture in said base, adjustable means for regulating the size of said aperture, said upholstery material extending over said arms, and grommets on said arms connected to said upholstery material to substantially seal the material to the arms, said material above said grommets and arms having fullness to permit the deflection of the arms independent of said spring strips.

10. In a unison seat construction, a base element made of a material impervious to the passage of air, spring strips supported on said base element extending from the front to the rear thereof, a pair of transverse spring strips secured to the base element beneath said first spring strips, clips connecting the pair of springs at the sides thereof, pivots extending outwardly of said clips, an upholstery material extending over said spring assembly and secured to said base, upwardly extending back supporting means from said base, a back element, pivot means securing the back element to said supporting means, and forwardly extending arms on the back element secured to said pivoted means.

11. In a unison seat construction, a base, a plurality of spring strips supported by said base across one dimension thereof, a plurality of spring strips spanning said base transverse of said first springs and disposed therebelow, means pivotally interconnecting said first spring strips to one edge of one of said second spring strips, means carried by said second spring strips having a pivot thereon at each end for unison deflection with both groups of said spring strips, an upholstery material enclosing said spring strips and secured to the base, a back element having forwardly extending arms the ends of which are secured to said pivots, upwardly extending supporting means from said base for the back element, and means interconnecting the supporting means and said back element which permits the vertical movement of the latter.

12. In a unison seat construction, a base element, spring strips supported on said base element extending from the front to the rear thereof, transverse spring means secured to the base element beneath said first spring strips, a pivot connected to the ends of said spring means above the base element at each side thereof, tie means pivotally anchoring said pivots to said base element, an upholstery material extending over said spring assembly and secured to said base element, upwardly extending back supporting means from said base, a back element, means securing the back element to said supporting means, and forwardly extending arms on the back element secured to said pivots.

References Cited in the file of this patent

UNITED STATES PATENTS

| | | |
|---|---|---|
| 1,420,990 | Friede | June 27, 1922 |
| 1,756,825 | Hess | Apr. 29, 1930 |
| 2,346,414 | Carpenter | Apr. 11, 1944 |
| 2,373,751 | Flint | Apr. 17, 1945 |

FOREIGN PATENTS

| | | |
|---|---|---|
| 554,802 | Great Britain | July 20, 1943 |